UNITED STATES PATENT OFFICE.

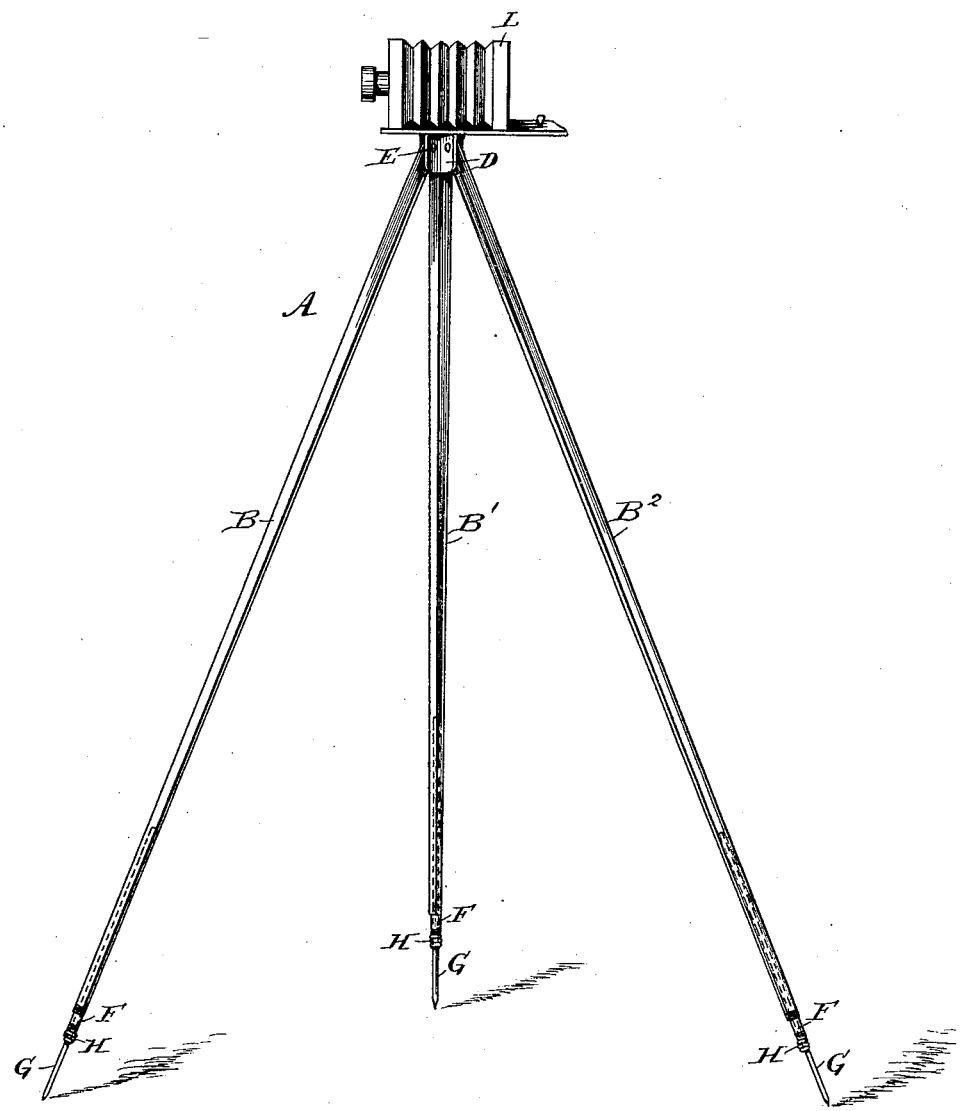

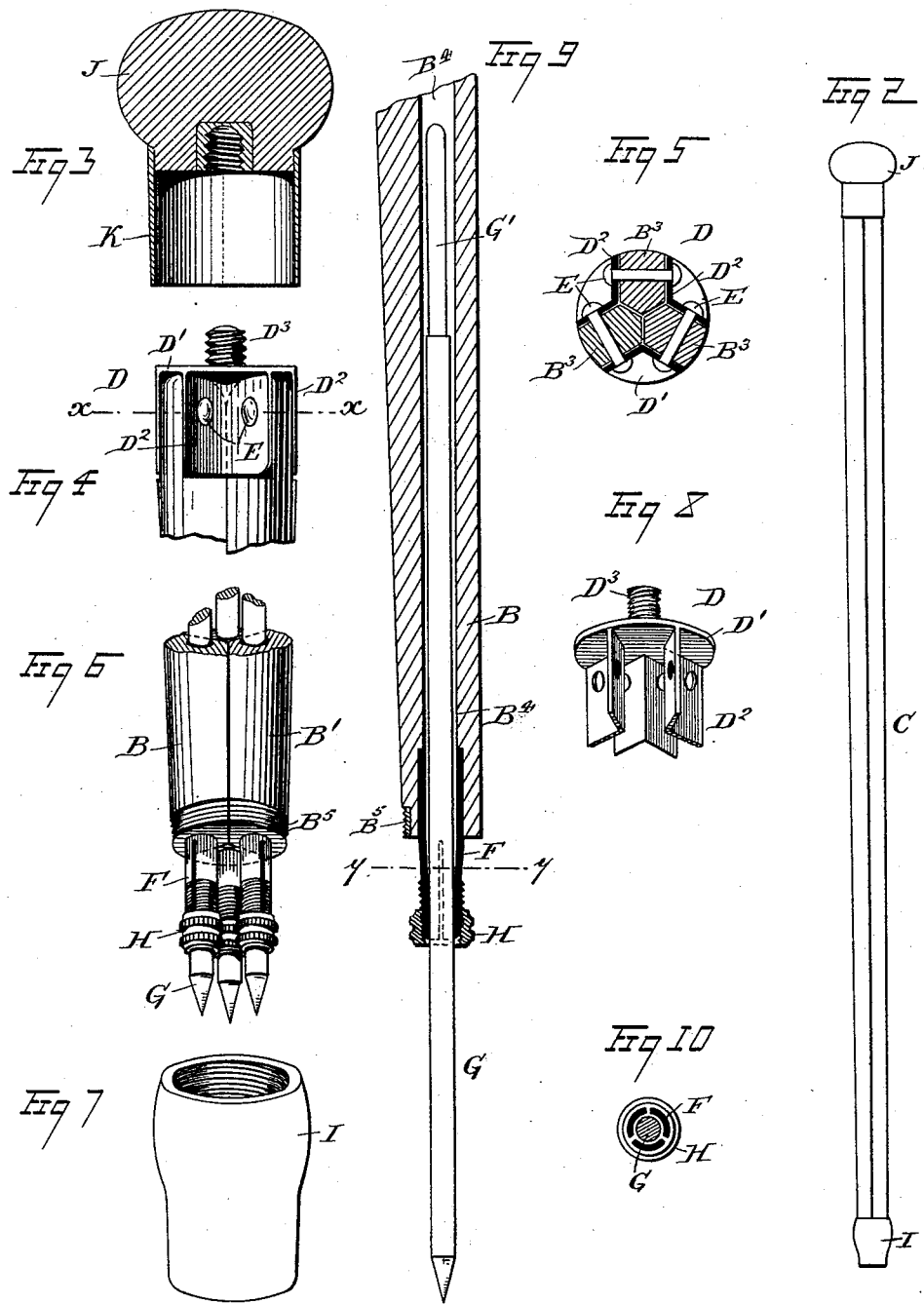

JOHN R. MOELLER, OF GRAND ISLAND, NEBRASKA.

TRIPOD.

SPECIFICATION forming part of Letters Patent No. 435,315, dated August 26, 1890.

Application filed August 16, 1889. Serial No. 321,007. (No model.)

*To all whom it may concern:*

Be it known that I, JOHN R. MOELLER, of Grand Island, in the county of Hall and State of Nebraska, have invented certain new and useful Improvements in Tripods, of which the following is a full, clear, and exact description.

The object of the invention is to provide a new and improved tripod, which is simple and durable in construction and specially adapted when unfolded for conveniently supporting photographic cameras, and when folded together is capable of use as a walking-stick.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a perspective view of the tripod unfolded for use as a camera-support. Fig. 2 is a side elevation of the same folded together for use as a walking-stick. Fig. 3 is an enlarged sectional elevation of the walking-stick knob. Fig. 4 is an enlarged elevation of the upper end of the tripod. Fig. 5 is a sectional plan view of the same on the line $x\ x$ of Fig. 4. Fig. 6 is an enlarged perspective view of the lower end of the folded tripod. Fig. 7 is an enlarged perspective view of the ferrule of the walking-stick. Fig. 8 is an enlarged perspective view of the head of the tripod. Fig. 9 is an enlarged sectional elevation of one of the extended legs of the tripod, and Fig. 10 is a sectional plan view of the same on the line $y\ y$ of Fig. 9.

The tripod A is provided with the legs B, B', and B², formed in such a manner that when folded up they form a cylindrical body C for use as a walking-stick, and are pivoted at their upper ends to a head D, provided with a top plate D', having downwardly-projecting V-shaped plates D², adapted to engage the adjacent sides of the offsets B³, formed on the upper ends of the tripod-legs B, B', and B². Said offsets B³ have parallel sides, as shown in Fig. 5, against which fit the V-shaped plates D² of the head D, and through said plates and offsets pass pivots E, so as to permit the tripod-legs to be swung outward, as shown in Fig. 1.

Each of the tripod-legs B, B', and B² is provided with an aperture B⁴, extending lengthwise in the leg from the bottom. In the lower end of this aperture B⁴ fits a split sleeve F, the split end of which projects to the outside, and through this sleeve F passes an extension-leg G, also passing into the aperture B⁴. Each extension-leg G is pointed at its lower end and is reduced at its upper end at G', so as to form a shoulder adapted to abut against the lower end of the sleeve F when the leg G is extended. A nut H screws on the threaded split end of each sleeve F, and serves to press the split sections of the sleeve F firmly in contact with the extension-leg G, so as to lock the latter in place either in an extended position, or in a closed position, or in an intermediate position.

At the lower end of each of the legs B, B', and B² is formed a screw-thread B⁵, forming a continuous thread when the three legs are folded together, as shown in Fig. 6, and on this thread then screws a hollow ferrule I, of sufficient size to conveniently inclose the lower ends of the extension-legs G and the projecting ends of the sleeves F. When the ferrule I is screwed on the legs, the latter are locked in place, inclosing the projecting ends of the extension-legs G and the sleeves F. The ferrule now forms the foot piece of the walking-stick.

From the top plate of the tripod-head extends a screw D³, upon which screws the walking-stick knob J to a contact with said plate, when the tripod is folded up for use as a walking-stick, as shown in Fig. 2. The knob J is provided with a downwardly-extending annular flange K, adapted to incase the head D, so that the latter is invisible when the knob is screwed on. Upon said screw D³ is also adapted to be screwed the bottom plate of the camera L, so that the latter is supported upon the tripod when the legs are extended, as shown in Fig. 1.

It will be seen that when the tripod is folded up and the knob J and ferrule I are screwed on, the device can be used as a walking-stick. When the tripod is to be used to support the camera, the ferrule I and the knob J are removed, the legs B, B', and B² are swung outward, and the extension-legs G are extended until the reduced portion G' is inclosed in the sleeve F, which latter is then pressed together at its split sections by screwing up the nut H. The camera L is now secured in the usual manner to the screw D³, as shown in Fig. 1. On uneven ground the extension-legs may be only partly drawn out and fastened in place so as to bring the camera to a level.

Having thus fully described my invention, I claim as new and desire to secure by Letters Patent—

1. A tripod and cane consisting of a head, legs permanently pivoted at their upper ends to said head and constructed to fold together to form a cane, a removable knob or handle secured on said head, and a removable ferrule, securing the lower ends of the legs together, substantially as set forth.

2. A tripod and cane consisting of a circular head, legs pivoted at their upper ends to said head within its periphery and folding together to form a cane, a removable knob or handle having a circular flange receiving said head and the upper ends of the legs, and a removable ferrule on the lower ends of the legs, substantially as set forth.

3. A tripod and cane consisting in a circular head having a screw D³ on its upper face, legs pivoted at their upper ends to the said head within its periphery and folding together into a cane, a removable ferrule on the lower ends of said legs, said screw being adapted to receive a cane knob or handle or a camera, substantially as set forth.

4. The combination, with a tripod-leg having a longitudinal bore B⁴ and a sleeve or tube F fixed in its lower end, provided with a tapering threaded longitudinally-slitted outer end, and a nut H screwing thereon, of an extension-leg extending through said sleeve into the bore, substantially as set forth.

JOHN R. MOELLER.

Witnesses:
THEO. G. HOSTER,
C. SEDGWICK.